Figure 1:
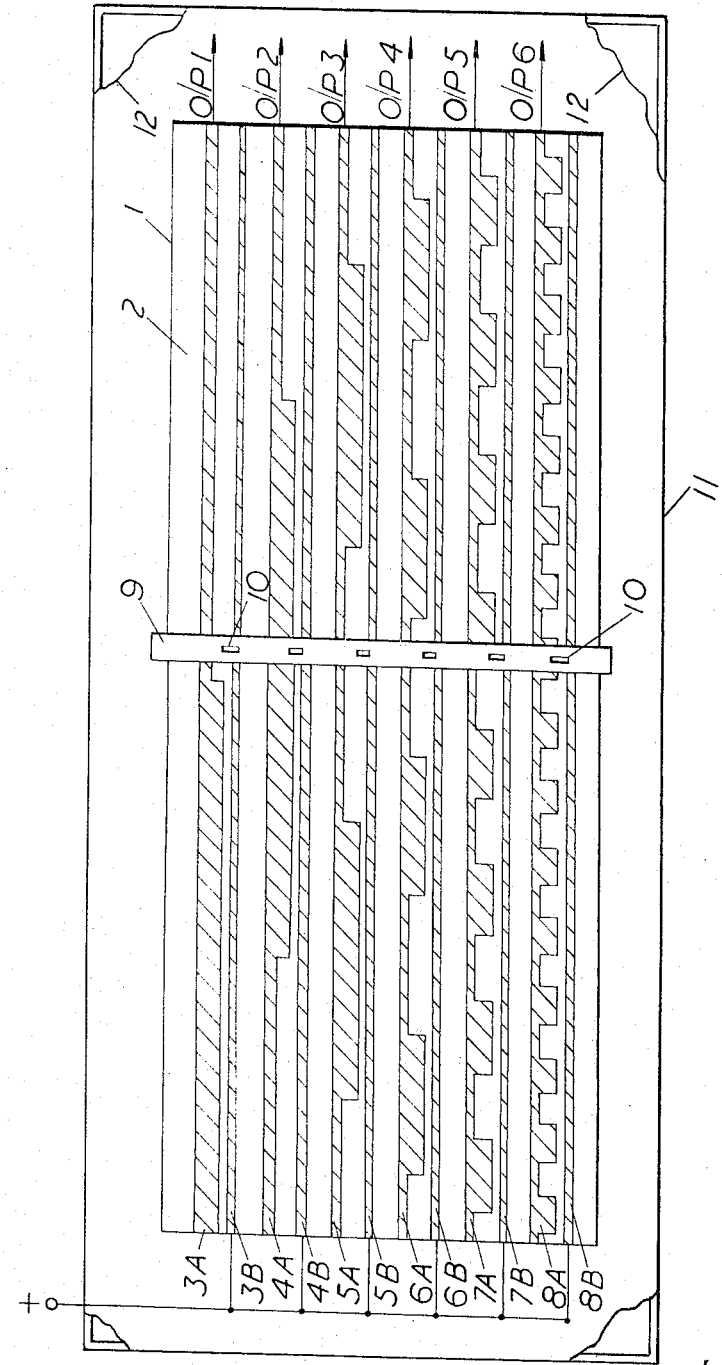

Dec. 12, 1967  P. J. CLARKE  3,358,278
MECHANICAL DIGITISERS
Filed Sept. 18, 1963  2 Sheets-Sheet 1

Inventor
P. J. CLARKE

By
Cameron, Kerkam & Sutton
Attorneys

Dec. 12, 1967     P. J. CLARKE     3,358,278
MECHANICAL DIGITISERS

Filed Sept. 18, 1963     2 Sheets-Sheet 2

INVENTOR
P. J. CLARKE
BY
Cameron, Kerkam + Sutton
ATTORNEYS

United States Patent Office 3,358,278
Patented Dec. 12, 1967

3,358,278
MECHANICAL DIGITISERS
Peter Jackson Clarke, Cheadle Hulme, Cheadle, England, assignor to Ferranti, Limited, Hollinwood, Lancashire, England, a company of Great Britain and Northern Ireland
Filed Sept. 18, 1963, Ser. No. 309,673
Claims priority, application Great Britain, Sept. 20, 1962, 35,781/62
10 Claims. (Cl. 340—347)

This invention relates to mechanical digitisers, that is to say apparatus whereby the relative position of two relatively movable members is represented by electrical signals in digital form.

Mechanical digitisers are now well known and usually include a code plate having a number of parallel or concentric tracks, the tracks being coded according to any particular numerical system which it is desired to employ. The code plate is attached to one of the two relatively movable members and a co-operating plate is attached to the other member.

The coded tracks of the code plate may be in the form of electrical contacts embedded in a plate of insulating material, each contact having a surface flush with the surface of the insulating material. For each track of the code plate the co-operating plate is provided with a sliding electrical contact, such as a brush or a rolling steel ball, which is urged into contact with the relevant track of the code plate. As relative movement occurs between the two members the coding arrangement of the code plate is such that over a number of ranges of movement the combination of tracks in which an electrical contact is made between the two sets of contacts is unique to a particular range, and that range may therefore be represented by a particular number of the numerical system in use.

In an alternative arrangement the tracks of the coded plate consist of transparent regions in an opaque plate. For each track of the code plate the co-operating plate is provided with a light source and a photo-cell, the track of the code plate being disposed between the light source and the photo-cell.

The operation of this arrangement is similar to that described above, there being a unique set of photo-cells energised for each of a number of ranges of movement.

The two kinds of digitiser described above, however, are subject to certain disadvantages. Digitisers of the sliding contact kind first described are subject to the usual disadvantages of sliding contacts, for example, dirty contacts, wear of the contacts and the deposition of conductive material on the insulating surface between the electrical contacts, and digitisers of the light source and photo-cell kind are expensive.

It is an object of the present invention to provide a mechanical digitiser which does not require the use of sliding contacts and which is inexpensive.

According to the present invention a mechanical digitiser for deriving an electrical indication of the relative position of two relatively movable members comprises a code plate secured to one of said members, said code plate having a plurality of pairs of strips of electrically conductive material, one strip of each pair being of castellated form such that alternate wide and narrow gaps are formed between the two strips of each pair, a coating of a material extending between the two strips of each pair, said material having an electrical resistance which varies when it is exposed to light, and for each pair of strips a light source attached to said other member, said light source being in the form of a line extending across the narrow gaps between the two strips of the pair but not across the wide gaps, said code plate, and said light source being enclosed in a light proof box.

The mechanical digitiser described in the immediately preceding paragraph may be modified in that said coating may extend across the narrow gaps between the two strips of each pair but not across the wide gaps, there being a single light source mounted on said other member, said light source being in the form of a line extending across all of said pairs of strips.

Said pairs of strips may be arranged as linear strips on a flat plate for indicating the relative position of two members capable of linear relative movement.

Alternatively, said pairs of strips may be arranged as co-axial rings on the surface of a cylinder or as annular rings on a plane surface of a disc for indicating the relative position of two members capable of rotational relative movement.

Said material having an electrical resistance which varies when it is exposed to light may be cadmium sulphide.

Figure 2:
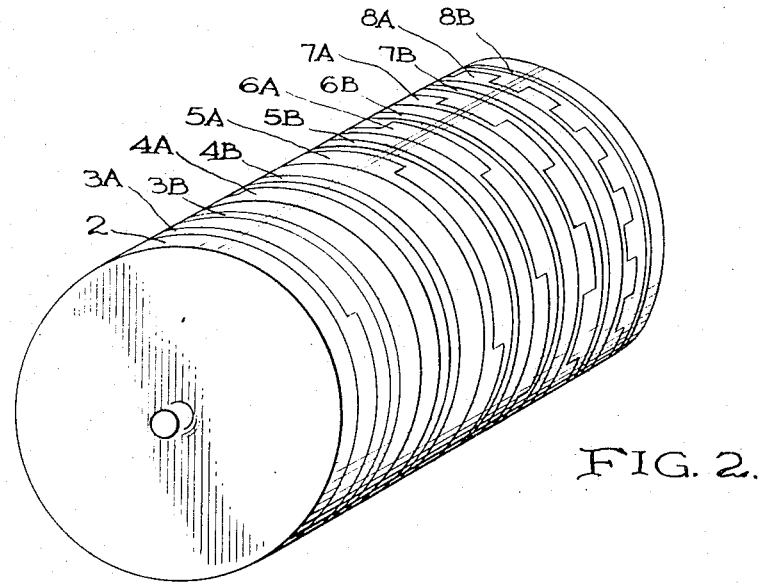
Figure 3:
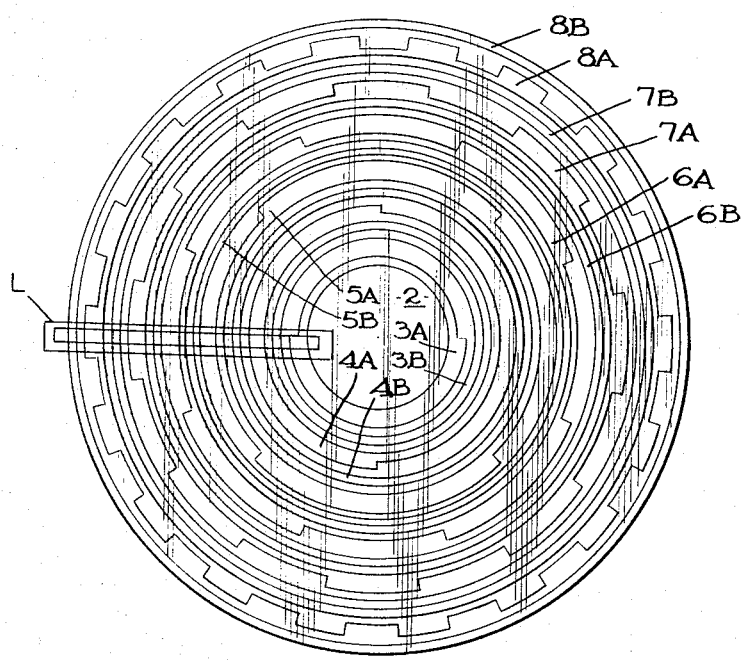

One embodiment of the present invention will now be described by way of example with reference to the accompanying drawings show in FIG. 1 a plan view of one form of mechanical digitiser in accordance with the invention and, in FIGS. 2 and 3, other forms of a mechanical digitiser wherein pairs of strips are arranged as co-axial rings on the surface of a cylinder and as annular rings on a plane surface of a disc.

Referring now to the drawings there is shown a mechanical digitiser suitable for indicating the position of a movable member with respect to a fixed member, the movable member being movable in a lyinear manner relative to the fixed member.

The digitiser shown comprises a code plate 1 which is rigidly secured to the fixed member (not shown). One surface of the code plate 1 is covered with a layer 2 of cadmium sulphide on top of which six pairs of strips 3A, 3B, 4A, 4B, . . . 8A, 8B of copper are deposited. The A strip of each pair is of castellated form and the B strip of each pair is straight such that alternate wide and narrow gaps are formed between the two strips of each pair, the castellations being different for each A strip. The B strip of each pair is connected to a source of direct current and the A strip of each plate is connected to an output lead O/P1 . . . O/P6.

A strip light source 9, masked apart from six slits 10, is rigidly secured to the movable member (not shown). Each pair of strips 3A, 3B, . . . 8A, 8B is associated with one of the slits 10 which are of such length that they extend across the narrow gaps between the two strips of a pair, but not across the wide gaps.

The code plate 1 and the light source 9 are enclosed in a light proof box 11 illustrated with its top surface 12 broken away for clarity.

In operation the cadmium sulphide has a high electrical resistance except when it is exposed to light when the electrical resistance becomes low. Therefore there is a high resistance path between the two strips of each pair other than the pairs where the light source formed by the associated strip 10 extends across a narrow gap between the two strips of the pair. Between the strips of these pairs there is a low resistance path and there will be an electrical output on the respective ones of the output leads O/P1 . . . O/P6. Therefore, as the movable member is moved relative to the fixed member there will be varying combinations of outputs on the output leads according to the position of the movable member relative to the fixed member. In the arrangement shown in the the drawing code plate 1 is divided into $2^6$ or 64 ranges by the six castellated strips 3A . . . 8A. Over each of these ranges there will be a unique set of outputs on the output leads O/P1 . . . O/P6. In the drawing, for example, there will be outputs on the output leads O/P2 and O/P6 thus giving the output 010001 in parallel form. The number of ranges for which a unique set of outputs is given may be increased by adding further pairs of strips to the code plate 1.

The strips 3A . . . 8A on the code plate 1 have been shown coded in accordance with the cyclic progressive code. This has been shown as a preferred form since only one output changes in moving the code plate 1 from one range to the next. The strips may however be coded according to any other suitable scale such as a binary scale.

The invention described above may be modified in many ways. For example, the cadmium sulphide may be applied as strips which extend across the narrow gaps between the two strips of each pair but not across the wide gaps, in which case the light source may be in the form of a single line L extending across all of the pairs of strips. Furthermore the pairs of strips have been described as linear strips for indicating the position of two members capable of linear relative movement. They may, however, be arranged as co-axial rings on the surface of a cylinder as shown in FIG. 2, or as annular rings on a plane surface of a disc for indicating the relative position of two members capable of rotational relative movement as shown in FIG. 3. Also, the light source may be steady or pulsed according to which kind of output the digitiser is required to give.

What I claim is:

1. A mechanical digitiser for deriving an electrical indication of the relative position of two relatively movable members comprising a code plate secured to one of said members, said code plate having a plurality of separate pairs of strips of electrically conductive materials, one strip of each pair being of castellated form such that alternate wide and narrow gaps are formed between the two strips of each pair, a coating of a material extending between the two strips of each pair, said material having an electrical resistance which varies when it is exposed to light, and for each pair of strips a light source attached to said other member, said light source being in the form of a line extending across the narrow gaps between the two strips of the pair but not across the wide gaps, said code plate and said light source being enclosed in a light proof box.

2. A mechanical digitiser as claimed in claim 1 in which said pairs of strips are arranged as linear strips on a flat plate for indicating the relative position of two members capable of linear relative movement.

3. A mechanical digitiser as claimed in claim 1 in which said material having an electrical resistance which varies when it is exposed to light is cadmium sulphide.

4. A mechanical digitiser for deriving an electrical indication of the relative position of two relatively movable members comprising a code plate secured to one of said members, said code plate having a plurality of separate pairs of strips of electrically conductive material, one strip of each pair being of castellated form such that alternate wide and narrow gaps are formed between the two strips of each pair, a coating of material extending across the narrow gaps between the two strips of each pair but not across the wide gaps, said material having an electrical resistance which varies when it is exposed to light, and a single light source for said pairs of strips mounted on said other member, said light source being in the form of a line extending across all of said pairs of strips.

5. A mechanical digitiser as claimed in claim 4 in which said pairs of strips all arranged as linear strips on a flat plate for indicating the relative position of two members capable of linear relative movement.

6. A mechanical digitiser as claimed in claim 4 in which said material having an electrical resistance which varies when it is exposed to light is cadmium sulphide.

7. A mechanical digitiser for deriving an electrical indication of the relative position of two relatively movable members comprising a code plate secured to one of said members, said code plate having a plurality of pairs of strips of electrically conductive material, one strip of each pair being of castellated form such that alternate wide and narrow gaps are formed between the two strips of each pair, a coating of material extending between the two strips of each pair, said material having an electrical resistance which varies when it is exposed to light, a light source attached to said other member for each pair of strips, said light source being in the form of a line extending across the narrow gaps between the two strips of the pair but not across the wide gaps, said code plate and said light source being enclosed in a light proof box and said pairs of strips being arranged as coaxial rings on the surface of a cylinder for indicating the relative position of two members capable of rotational relative movement.

8. A mechanical digitiser for deriving an electrical indication of the relative position of two relatively movable members comprising a code plate secured to one of said members, said code plate having a plurality of pairs of strips of electrically conductive material, one strip of each pair being of castellated form such that alternate wide and narrow gaps are formed between the two strips of each pair, a coating of material extending between the two strips of each pair, said material having an electrical resistance which varies when it is exposed to light, a light source attached to said other member for each pair of strips, said light source being in the form of a line extending across the narrow gaps between the two strips of the pair but not across the wide gaps, said code plate and said light source being enclosed in a light proof box and said pairs of strips being arranged as annular rings on a plane surface of a disc for indicating the relative position of two members capable of rotational relative movement.

9. A mechanical digitiser for deriving an electrical indication of the relative position of two relatively movable members comprising a code plate secured to one of said members, said code plate having a plurality of pairs of strips of electrically conductive material, one strip of each pair being of castellated form such that alternate wide and narrow gaps are formed between the two strips of each pair, a coating of material extending across the narrow gaps between the two strips of each pair but not across the wide gaps, said material having an electrical resistance which varies when it is exposed to light, a single light source for said pairs of strips mounted on said other member, said light source being in the form of a line extending across all of said pairs of strips and said pairs of strips being arranged as coaxial rings on the surface of a cylinder for indicating the relative position of two members capable of rotational relative movement.

10. A mechanical digitiser for deriving an electrical indication of the relative position of two relatively movable members comprising a code plate secured to one of said members, said code plate having a plurality of pairs of strips of electrically conductive material, one strip of each pair being of castellated form such that alternate wide and narrow gaps are formed between the two strips of each pair, a coating of material extending across the narrow gaps between the two strips of each pair but not across the wide gaps, said material having an electrical resistance which varies when it is exposed to light, a single light source for said pairs of strips mounted on said other member, said light source being in the form of a line extending across all of said pairs of strips and said pairs of strips being arranged as annular rings on a plane surface of a disc for indicating the relative position of two members capable of rotational relative movement.

References Cited

UNITED STATES PATENTS

| | | | |
|---|---|---|---|
| 2,930,999 | 3/1960 | Santen et al. | 250—211 |
| 3,027,528 | 3/1962 | Harmon et al. | 250—211 |
| 3,192,393 | 6/1965 | Brodersen | 250—211 |
| 3,187,187 | 6/1965 | Wingate | 340—347 |
| 3,248,727 | 4/1966 | Anastasia | 340—347 |

MAYNARD R. WILBUR, *Primary Examiner.*

DARYL W. COOK, *Examiner.*

K. R. STEVENS, W. J. KOPACZ, *Assistant Examiners.*